Patented July 16, 1935

2,007,965

UNITED STATES PATENT OFFICE 2,007,965

EDIBLE SYNTHETIC ESTER RESINS

Carleton Ellis, Montclair, N. J., assignor to Ellis-Foster Company, a corporation of New Jersey No Drawing. Application June 29, 1929, Serial No. 374,959

10 Claims. (Cl. 260—8)

This invention relates to edible synthetic ester resins especially adapted for utilization in the field of grease-proof wrapping paper for foodstuffs, chewing gum compositions, chicle substitutes and the like, and relates especially to resins made with the aid of a polyhydric alcohol and a polybasic acid; the latter pr ferably being of the fruit acid type.

A series of resins may be made by reacting on a polyhydric alcohol, such as glycerol, polyglycerol, glycol, polyglycols and the like, with various polybasic organic acids of the aliphatic and aromatic series and the like. A number of such resins intended for industrial purposes, such as used in various coating compositions, molded articles and so forth, are not particularly well adapted for employment in connection with the foodstuff industry owing to the possibility that the acid component may be deleterious if taken into the human organism.

In the present invention it is an object to produce resinous bodies from polyhydric alcohols and organic acids of the fruit acid type, such as citric, tartaric and malic acids, which are more suitable for ingestion, at least in moderate quantities. Resins made from polyhydric alcohols and such fruit acids, with or without other modifying acids, such as those derived from animal and vegetable oils, including oleic, palmitic and stearic acids, do not hazard the criticism that acids of unknown physiological effect are present. Such resins, therefore, when used to treat paper in which foodstuffs are wrapped, even though some part of the resin should be absorbed by the foodstuff, cannot be held to introduce any foreign substance of a toxic or injurious nature.

Therefore, in using the term "physiological synthetic resin", I refer to these described types of resins which have the property of being non-toxic to the human system or, in other words, may be ingested, at least in moderate quantities, without injury to the human system.

In my co-pending application Serial No. 609,136, I have referred to the production of resins from glycerol, polyglycerol, glycol and similar polyhydric alcohols with tartaric acid employed in molecular proportions yielding a solid insoluble mass at about 200° C. Malic acid and glycerol in like proportions yield a solid mass at about 210° C. The addition of oleic and stearic acid yields modified resins. A resin mentioned in said specification is that obtained by using 75 parts of tartaric acid and 46 parts of glycerol heated with 31 parts of boric acid to 140° C., yielding a transparent amber-colored mass soluble in hot water. At 160° C. an opaque brittle product, also soluble in hot water, is obtained. The presence of boric acid in such a composition, owing to its mild antiseptic qualities, may be regarded effective when the resin is used in the coating or impregnation of paper intended for wrapping foodstuffs. The solubility in water may be reduced by further heating.

Various basic substances, such as calcium oxide, magnesium oxide and the like, as noted in Serial Numbers 609,136 and 609,134, may be added to accelerate the transformation and produce a more or less spongy solid in which form the material may be of particular value for incorporation in chewing gum products or other products of a generally similar character which are to be masticated for their content of flavor and sugar or for some medicating purpose.

In other words, the invention comprehends a physiological synthetic resin or resinous body, gum or similar substance which when used in any manner which would bring about liability of ingestion through contact with foods, as in the case of wrapping paper, or when used as a sealing layer for jellies and the like, employed in chewing gum and so forth, will be free from any unpleasant or toxic action on the human body.

Reference likewise is made to Serial 261,708, relating particularly to the production of a grease-repellent paper. Among the resins described for making paper such as "butcher's wrap", "butter wrap" and "candy wrap" are those prepared from citric, tartaric and malic acids, that is, the outstanding fruit acids. Other acids, such as succinic, maleic and so forth, are mentioned in said specification. While it may be possible to use certain of these other acids in lesser or greater proportion, the invention will be largely confined to resins of the fruit acid type with or without acids of animal and vegetable oils. In Serial No. 261,708, I also mention the employment of pentaerythritol and organic oxides, such as ethylene and butylene oxides. The polyhydric alcohol likewise should be selected with reference to its substantially neutral or beneficent effect from the physiological standpoint.

In the last mentioned application I have set forth particularly resins made from glycerol, phthalic anhydride and stearic acid, or the distilled fatty acids of cottonseed oil and similar resins. The resins of the present invention may be made in most cases by replacing the phthalic anhydride by its corresponding chemical equivalent of the fruit acid. Emulsions described in said application likewise may be prepared from the physiological resin and used for surfacing paper or in other ways within the field contemplated by the present invention.

Further I wish to refer to Serial No. 281,375, relating particularly to resins in which stearic acid is an essential component, the disclosures of said application being instructive with reference to the preparation of fruit acid resins. In addition to the typically resinous materials, I may also employ resins reacted to the point where they yield products having a certain degree of stretch or elasticity ranging from products of soft consistency but with slight indications of elasticity to the more spongy products described in Serial 609,136. The stearic wax mentioned in Serial 281,375 and in other co-pending applications likewise may be employed, especially in conjunction with a fruit acid resin or gum.

In many of my co-pending applications on the polyhydric alcohol polybasic acid type of synthetic resin, I have been concerned especially with the production of resins which would be soluble in various organic solvents, but in the present instance the matter of solubility is not of prime importance and reaction, therefore, may be carried further yielding spongy products which are largely insoluble in the usual run of solvents but which, by virtue of being further reacted, have a lower acidity and are freer from any sharp acid taste which might impair their usefulness in foodstuff wrapping papers, chewing gum and so forth. Resins which are soluble made from phthalic and stearic acids and glycerol or with the distilled acids of cottonseed oil used in place of stearic acid are somewhat limited from the standpoint of hardness. When coating paper with a fairly heavy layer of a synthetic resin of this type, sticking of the sheets together may occur if the resin is not sufficiently reacted. By carrying the resinification beyond the stage of normal solubility to obtain a more gelatinous factis-like material or spongy solid and emulsifying such products in an aqueous alkaline medium, liquid compositions may be secured which may be applied in various industries as desired. When the limitation is not imposed of a resin which is unquestionably free from any deleterious action through contact with foodstuffs a wide range of resins may be prepared of this type in the gelatinous or factis-like form or in a state somewhat approximating this may be made for various industrial purposes. On the other hand, the field which the present invention particularly concerns is that in which the physiological synthetic resin is to be applied and in which the solid fruit acids usually of a crystalline character, such as citric, tartaric and malic acids or their physiological equivalents are called into use.

The following examples illustrate various types of resins or factis-like products of differing degrees of solubility in water and organic solvents or possessing complete insolubility in some cases and having in other cases reached a stage of reaction which may render them almost infusible or only slightly fusible but softened to some extent by heating so that they can be utilized in various ways.

In the following examples the proportions given are parts by weight.

*Example 1*

Citric acid _____ 52.5
Glycerol _____ 24

Reaction began at 130° C. and the temperature was gradually raised to 250° C., test portions being drawn at intervals.

A sample drawn at 160° was quite soft and plastic, 15 minutes later at 160–165° a soft solid and 10 minutes thereafter, at approximately the same temperature, a solid tending somewhat towards brittleness was obtained on cooling.

*Example 2*

Citric acid _____ 210
Diethylene glycol _____ 167

At 195° C. the source of heat was removed and on cooling a viscous balsam resulted. A portion of this was incorporated on milling rolls with 20 per cent of its weight of pale crepe rubber. A soft plastic product resulted which was baked at 150° C. over a period sufficient to solidify to a greater degree and render non-sticky. A somewhat rubbery product resulted.

*Example 3*

Malic acid _____ 67
Diethylene glycol _____ 55.7

Temperature raised to 260–270° C. yielding a viscous balsam practically insoluble in water. On continuing the heating at 270–280° the liquid melt suddenly polymerized to a somewhat elastic gel.

*Example 4*

Malic acid _____ 101
Diethylene glycol _____ 42
Glycerol _____ 24

(Diethylene glycol and glycerol are used in proportions to give them approximately equivalent esterification power.)

The temperature was raised to 220–240° C. and samples were drawn at intervals showing a gradual conversion through various stages of plasticity from liquid to solid, finally yielding semi-elastic gels. Finally a gelatinized product was secured which on chewing had practically no tart flavor indicative of practically complete combination of the malic acid.

*Example 5*

Malic acid _____ 97
Glycerol _____ 31
Diethylene glycol _____ 27

In this example glycerol is employed in a proportion to accomplish approximately ⅔ of the esterification.

Test samples drawn at intervals first at 200° C., 10 minutes later at 205° and shortly thereafter at 210° when noticeable thickening had set in, all were found to be rather stiff plastics just yielding to the finger nail. The products obtained according to this treatment were stiffer and somewhat tougher than those obtained under Example 4.

*Example 6*

Malic acid _____ 101
Glycerol _____ 28
Diethylene glycol _____ 42
Rosin _____ 42

The malic acid, diethylene glycol, rosin and 24 parts of glycerol were heated to 210–220° C., whereupon the rosin entered into combination. Thereupon the remaining 4 parts of glycerol were added to the melt which at that time had reached temperature of 230–240°. The heating was continued at this temperature for about 15 minutes longer or until a sample was found to be clear on cooling. The product when cold was a light amber plastic, not as suitable for introduction into chewing gum owing to the presence of the rosin. The latter, however, improves water resistance and hence may prove a valuable addition in connection with the treatment of certain grades of paper.

Example 7

| | |
|---|---|
| Malic acid | 101 |
| Glycerol | 30.7 |
| Diethylene glycol | 41.7 |
| Rosin | 41 |
| Stearic acid | 24.8 |

In this case, instead of mixing in a particular order, the ingredients were heated all together to a temperature of 230–240° C. when combination appeared to be practically complete. This required heating for approximately 1 hour. A very tough plastic was obtained which somewhat resembles chicle, being plastic and extensible.

Example 8

| | |
|---|---|
| Malic acid | 46 |
| Diethylene glycol | 50.4 |
| Stearic acid | 62.4 |

The temperature was carried to a maximum of 270–280° C. At 240° C. a sample withdrawn was somewhat lighter in color than the final product. Both the intermediate and the final product were non-sticky and had a slightly waxy appearance.

Example 9

| | |
|---|---|
| Malic acid | 74 |
| Diethylene glycol | 68 |
| Stearic acid | 33.4 |

Temperature reached 280–290° C., an intermediate sample being withdrawn at 230–240°. Both intermediate and final products were of a soft consistency, slightly unctuous but nevertheless with a suggestion of resinous basis. These products when applied to the skin were found to spread readily and have excellent adherence and apparently effective absorptive qualities suggestive of lanolin. It is proposed to use these unctuous physiological synthetic resins as ointment bases to carry medication of various kinds.

Example 10

| | |
|---|---|
| Malic acid | 56 |
| Diethylene glycol | 49 |
| Stearic acid | 13.4 |

Temperature 260–270° C. yielding a rather dark-colored soft rather unctuous product.

Example 11

| | |
|---|---|
| Malic acid | 56 |
| Diethylene glycol | 13.7 |
| Glycerol | 7.1 |
| Stearic acid | 13.4 |

At 250° C. the reaction approached completion, at 250–260° the product had properties which may be described as both resinous and greasy. At 270–280° C., which represened the final stage of heating, a plastic resulted which was somewhat softer than chicle. It was gelatinized to a somewhat elastic, extensible, slightly sticky product practically free from tart taste on chewing and softening on heating.

Example 12

| | |
|---|---|
| Malic acid | 56 |
| Diethylene glycol | 24.5 |
| Glycerol | 14.2 |
| Stearic acid | 13.4 |

All of the stearic acid and the diethylene glycol and 27 parts of the malic acid were mixed and heated to 240–250° C. until combination resulted. The remainder of the malic acid was introduced and then the glycerol added. At 250–260° C. an intermediate product was obtained which was non-sticky and somewhat elastic. It was practically insoluble in water and had to a very considerable extent the quality of chicle. On final gelatinization a much tougher and somewhat elastic-on-extension product which was fairly hard resulted.

Various other substances may be incorporated with the foregoing, including rosin and other miscible resins and various other substances of a kindred nature; also fillers of various kinds, depending upon the particular application made of the product. In the case of certain of the resins intended to be used as substitutes for chicle or for mixture therewith in chewing gum compositions, I have observed the addition of a small percentage, say 5 per cent, of bentonite or other similar type of clay, also light magnesium oxide, appears to improve the masticability of the gelatinized physiological synthetic resins containing fruit acids in combination.

As previously stated, emulsions can be made from the foregoing products, some of these emulsifying more readily than others, especially those containing a soap-forming fatty acid such as stearic or oleic. Thus the product made according to Example 8 was added in the molten state to water heated to boiling and a small amount of ammonium hydroxide added with rapid stirring provided by a mechanical agitator. An emulsion resulted which when cold was applied to paper and the latter dried at approximately 70° C.

What I claim is:

1. An edible synthetic resin containing combined malic acid and diethylene glycol.
2. An edible synthetic resin containing combined malic acid, diethylene glycol and glycerol.
3. An edible synthetic resin containing combined malic acid, stearic acid, diethylene glycol and glycerol.
4. An edible synthetic resin containing combined malic acid, stearic acid and diethylene glycol.
5. A substance adapted to be incorporated in chewing gum to replace chicle in whole or in part comprising an edible synthetic resin ester containing malic acid and diethylene glycol in combination.
6. A substance adapted to be incorporated in chewing gum to replace chicle in whole or in part comprising an edible synthetic resin ester containing malic acid, diethylene glycol and glycerol in combination.
7. A substance adapted to be incorporated in chewing gum to replace chicle in whole or in part comprising an edible synthetic resin ester containing malic acid, stearic acid, diethylene glycol and glycerol in combination.
8. A substance adapted to be incorporated in chewing gum to replace chicle in whole or in part comprising an edible synthetic resin ester containing malic acid, stearic acid and diethylene glycol in combination.
9. An edible resinous product comprising an ester of diethylene glycol with an acid selected from the group consisting of malic acid, citric acid and tartaric acid.
10. An edible resinous product comprising an ester of diethylene glycol with a non-toxic fatty acid and an acid selected from the group consisting of malic acid, citric acid and tartaric acid.

CARLETON ELLIS.